Feb. 27, 1962     I. J. BARBER     3,023,296
RADIANT HEATING DEVICE
Filed Feb. 23, 1960     2 Sheets-Sheet 1
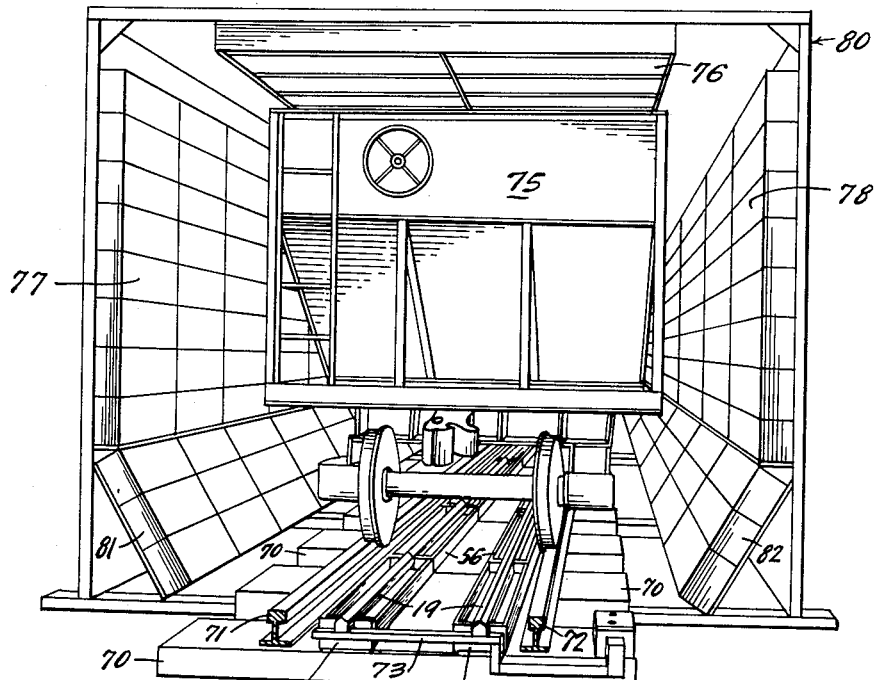
FIG-1-
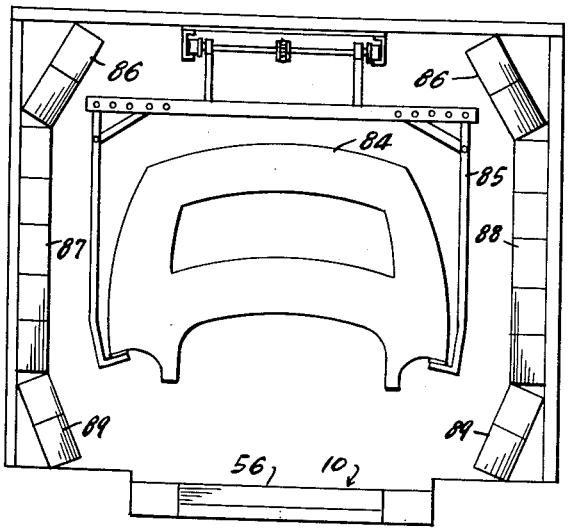
FIG-2-
INVENTOR:
IRA J. BARBER
BY
Hugh A Kirk
ATTY.

Feb. 27, 1962  I. J. BARBER  3,023,296
RADIANT HEATING DEVICE
Filed Feb. 23, 1960
2 Sheets-Sheet 2
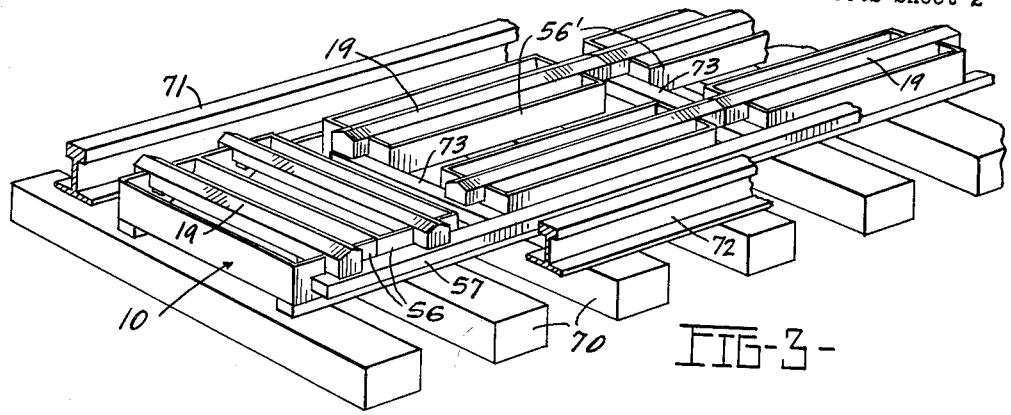
FIG-3-
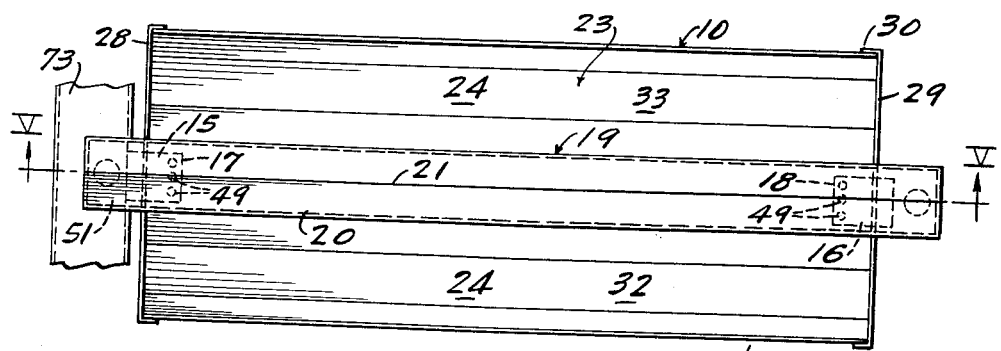
FIG-4-
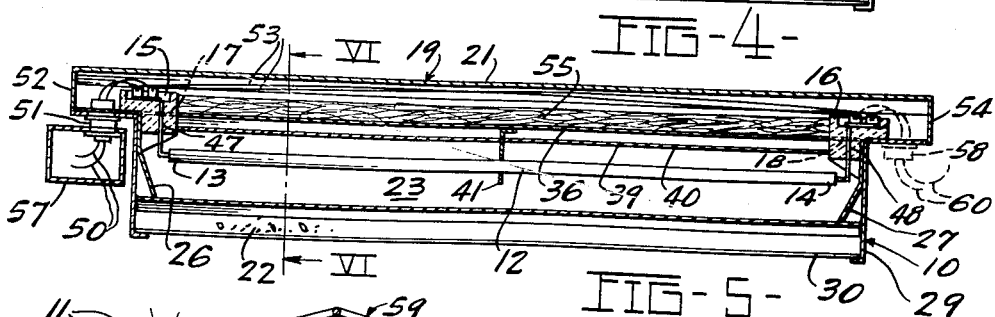
FIG-5-
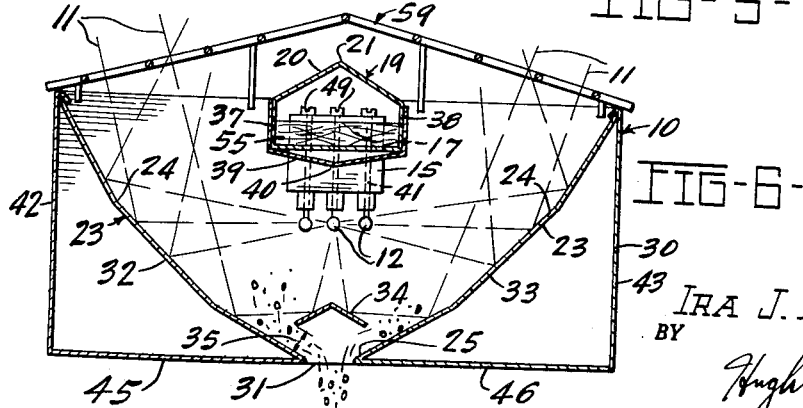
FIG-6-
INVENTOR:
IRA J. BARBER.
BY
Hugh A Kirk
ATTY.

United States Patent Office 3,023,296
Patented Feb. 27, 1962

3,023,296
RADIANT HEATING DEVICE
Ira J. Barber, Fostoria, Ohio, assignor to Fostoria Corporation, Fostoria, Ohio, a corporation of Ohio
Filed Feb. 23, 1960, Ser. No. 10,295
4 Claims. (Cl. 219—34)

This invention relates to an electrical heat source. More particularly, it deals with an electrical infra-red heat source, and attendant apparatus, which may be used conveniently and efficiently underneath an object which is to have heat applied to its underside.

Today, it is common practice to heat vehicles for various reasons. One of the most common occurrences of such vehicle heating is practiced upon hopper-type railroad cars to thaw the car and its contents such as coal and ore, when the loaded car contains material which has been frozen together and frozen to the car. This is done so the car may be readily emptied, either by opening the hopper doors in the bottom of the car, or by inverting the entire car, thus dumping the contents. The standard procedure has been to use gas or oil torches to heat the vehicle, but this practice results in damage to the cars, fuel handling problems, and results in varying efficiency in the presence of wind drafts, among other disadvantages.

Recently use has been made of electrical infra-red heat sources which produce uniform heating since the heating process is one of radiation rather than of convection or conduction. When these electrical means are used, they have been limited to installations along the top, sides, and lower corners of the hopper cars, since the units which might be installed underneath the car would rapidly fill with dirt and foreign particles falling from the car being heated. This dirt and foreign matter either entirely clogs the reflector of the radiation unit, or dirties and fouls the unit to such an extent that the unit is wholly inefficient and better not be used at all.

Another common application of this type of heating is found in the automotive assembly lines. For example, the auto body is sprayed with water to remove the residue from the sanding and buffing operations and is then dried; however, the use of electrical infra-red radiation unit is normally not possible in the drying installation since water would collect in the concave reflectors of these units. This heat drying procedure also may take place after the auto body has been painted.

It is an object of this invention to produce a simple, efficient, modern, safe and effective apparatus for supplying heat in an upward direction and which may be used, for example, underneath railroad hopper cars for thawing of such vehicles.

Another object of this invention is to provide a heat source which will furnish a uniform distribution of heat over the bottom of an object to be heated.

Another object of this invention is to provide an easily installed, unitized fixture which may be combined with other such units to produce an inexpensive, versatile car heating installation.

Another object of this invention is to provide a heat source for such installations which is not adversely affected by wind drafts and which cannot be extinguished by such drafts.

Another object of this invention is to produce an easily cleaned heat source which may be located beneath a bulk cargo-carrying vehicle and which is not damaged and is inherently free from clogging by matter falling from such vehicles.

Another object of this invention is to produce a heat source which is rugged enough to withstand temperature shocks as well as physical vibrational shocks.

In general, this invention is a heating device comprising: one or more infra-red radiation elements which may be electrical in nature and a unitized supporting, containing and reflecting means for such radiation elements. The reflecting means is so designed to direct the maximum radiations from the heating elements and provides an escape means permitting small particles of foreign matter falling on the unit to pass through the device without loss of radiation through such escape means. This supporting and containing means also includes shield and guard means for protecting the radiation elements from damage by large particles of such falling foreign matter.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a perspective end view of a car thawing installation with a gondola type car therein showing vertical and inclined banks of infra-red heat sources along the side of a tunnel-like structure, a downwardly directed bank of radiators along the top of the structure above a hopper car to be thawed, and a bank of infra-red heat sources according to this invention located beneath the car between the rails on which the car rides;

FIG. 2 is an end view of a drying section of a mechanized car body drying installation showing a wet and dripping car body in a tunnel having infra-red heat sources on its interior sides with those on the floor of the tunnel being devices according to this invention;

FIG. 3 is a perspective view showing devices of this invention installed in two different manners between the rails of a railroad, such as for a thawing device of FIG. 1;

FIG. 4 is an enlarged top plan view of one embodiment of a unit according to this invention as shown in the installations of FIGS. 1, 2 and 3, showing a wiring connection channel and heating element shield extending over the top center of the unit;

FIG. 5 is a longitudinal cross-sectional side view taken along line V—V in in FIG. 4 showing an infra-red radiation heating element therein;

FIG. 6 is a further enlarged transverse cross-sectional view taken along line VI—VI of FIG. 4 or 5 showing the concave reflector, the lower aperture therein with foreign matter passing therethrough the aperture, an intermediate reflector above the aperture and below the radiation elements and a grate cover for the unit with dashed lines representing the reflected rays of infra-red radiation from the radiation element.

The Heat Source

In a preferred form of this invention for an infra-red heating device 10, the infra-red radiations 11 may be emitted by one or more electrical sources or lamps 12 (see FIGS. 5 and 6) having ends 13 and 14. These lamps may be General Electric Co. T-3 lamps, sheath metal or "Calrod" type of electrical radiators, quartz lamps, or any suitable electrical element of similar manufacture; however, any tubular heat source, such as those which supply heat radiations through the combustion of a gas or liquid fuel, also may be used.

Referring to FIGS. 4, 5 and 6, the preferred form of electrical infrared heat sources 12 may be accommodated in holding means 15 and 16, such as for example, porcelain connector receptacles of the type disclosed in assignee's copending U.S. patent application Serial No. 664,612 filed June 10, 1957. These receptacle holding means may be located in conjunction with apertures 17 and 18 near the ends and in the lower portion of a protecting tubular shield means forming an upper structural member, and socket channel 19 located above and in alignment with the heat sources 12.

Since this invention is primarily directed toward use where the radiations 11 (see FIG. 6) are directed upwardly, the protecting shield means 19 may be utilized to protect the radiation elements 12 from breaking, clogging, and dirtying, or other such undesirable incidents, by dirt, water, or other foreign particles and matter which fall from above and thereby enter the heat source unit 10. This shield or socket channel 19 may be constructed of steel, aluminum, or other suitable material and may normally extend over the radiation elements 12 to such an extent that the elements 12 are protected when viewed from a point substantially vertically above such a shield 19. However, the shielding socket channel upper structural member 19 should not extend laterally to such a degree that it interferes with the rays 11 being directed by the reflectors below. The upper portion 20 of the upper structural member 19 may be peaked 21 to aid in the deflection of foreign matter 22 and to increase the structural rigidity of the member 19.

The Reflectors and Supporting Unit

A concave reflector 23 is located beneath the radiation elements 12 and their accompanying shield 19. If the heating elements 12 are infra-red tubular lamps, the most advantageous form of reflector 23 would resemble a trough whose axis is aligned parallel with the axis of the radiation elements 12. However, other shapes of reflectors may be used, for example; a bowl-like reflector. The reflector 23 may best be located beneath the radiation elements and may be functionally cooperating with the elements 12 so that the infra-red rays 11 produced by the elements 12 are reflected in an upward direction. The surface 24 of this reflector 23 should be as glossy as possible so that the reflector 23 will absorb as little heat as possible. A gold tinted or anodized reflector 23 is particularly efficient.

A transverse cross-section of the reflector 23 may resemble a parabola of smoothly changing shape, or the section may be composed of straight line segments. Best results, however, are produced when the reflector 23 is shaped so as to avoid level flat spots at the region of the lowermost point 25 in the reflector. The reflector 23 itself, if trough shaped, may be open at the ends. The ends of the reflector may be closed by reflectors 26 and 27 at the ends 28 and 29 of the body 30 of the device 10.

In the lowermost portion 25 of the concave reflector 23 below the radiation elements 12, may be located an aperture 31 which extends along the reflector 23 parallel to the axis of the reflector 23. This aperture 31 may divide the reflector 23 into two separate pieces 32 and 33, but the two pieces 32 and 33 may be considered as one reflector 23 when the device 10 of this invention is completely assembled. The separate pieces 32 and 33 of the concave reflector 23 may be held in proper relation to each other by the body 30 of the device 10.

Located directly above the bottom aperture 31 and below the radiation elements 12 may be an intermediate or secondary reflector 34 which may functionally cooperate with the concave reflector 23 (32 and 33) to reflect those rays from the radiation elements 12 which would normally pass through the aperture 31 in the concave reflector 23. This intermediate reflector 34 may be located so that there is a pronounced space 35 between the intermediate reflector 34 and the closest portion of the concave reflector 23. This space 35 permits foreign matter 22 which falls into the open upper face of the concave reflector 23 to pass to a position beneath the intermediate reflector 34 and then pass from the device 10 through the bottom aperture 31.

Located adjacent the bottom 36 and sides 37 and 38 of the upper structural member 19 may be a third reflecting plate 39 which may peak 40 downward along the center of the bottom surface 36 of the upper structural member 19. This reflector 39 serves to direct the radiations 11 of the radiation elements 12 toward the upwardly directed concave reflector 23 and intermediate reflector 34 keeping the amount of heat absorbed by the socket, shield or channel 19 to a minimum.

In many instances the heat sources 12 may be subjected to physical abuse and shocks, thus support members 41 (see FIG. 5) attached to the bottom 36 of the shield protecting means 19 and extending through the downwardly directed reflector 39, may be employed to support the radiation elements 12 at various positions intermediate of their ends 13 and 14.

The upper structural member 19 with its downwardly directed reflector 39, the concave upwardly directed reflector 23 portions 32 and 33, the intermediate reflector 34, and the end reflectors 26 and 27 may be held in rigid and proper alignment by a body, casing, or shield 30 of the device which has sides 42 and 43, ends 28 and 29, and bottom portions 45 and 46, which latter portions are separated to maintain the opening provided by bottom aperture 31.

For additional protection of the device 10, a screen, grid, or grille 59 (see FIG. 6) constructed of heavy wire or sheet metal may be installed over the open face of the unit.

The Wiring and Associated Structure

In suplying the preferred form of this invention with electrical energy two methods of supply may be used; FIG. 5 illustrates one of these methods. The terminal leads 47 and 48 of the radiation source lamps 12 may pass through the holding means 17 and 18 to a binding post type of connection elements 49 adjacent the upper portions of the holding means 17 and 18. Electrical energy may be supplied to the unit 10 by wires 50 which may enter the socket channel 19 adjacent lamp holding means 15 and which may connect with the binding post connection elements 49 on the insulator type of lamp holding means 15. The electrical supply wires 50 may enter the socket channel 19 by means of the inlet fitting or junction box 51 attached to the underside of the projecting end 52, adjacent the body end 28 of the socket channel 19.

Inside the upper structural member socket channel 19, wires 53 may be connected from the binding posts 49' on the lamp holding means 16 at the opposite end 14 of the radiation source elements 12 and at the opposite end 54 of the socket channel for completion of an electrical circuit. These circuit completing wires 53 may be run back from end 54 of the socket channel to end 52 and passed out of the socket channel through the junction box 51 to be connected to an electrical supply network external to that described. In order to maintain safe temperatures in the insulation of the circuit completing wires 53, when such wires are utilized, a layer of insulation 55, such as fiberglass blanket material, may be installed between the wires 53 and the bottom 36 of the socket channel 19. The reflector 39 around the lower periphery 36, 37, and 38 of the socket channel also aids in lowering the temperature inside the upper structural member 19.

The external wiring 50 may be supplied to a bank 56 (see FIG. 3) of infra-red heating devices 10 through a wiring channel or connecting member 57, shown cooperating with the inlet fitting 51 in FIG. 5. This connecting member 57 may be fabricated of metal sheet and preferably should be watertight to prevent damage to the insulation of the wires 50 therein.

A second form of supplying electrical energy is possible when a second inlet fitting or junction box 58 (shown in dotted lines in FIG. 5) is installed in the underside of the projecting end 54 of the socket channel 19 adjacent the end 29 of the body 30 of the unit 10. In such installations the circuit completing wires 53 are not required and are supplanted by the external connecting wires 60 (shown in dotted lines). A second end wiring channel (not shown), may then be utilized in conjunction and parallel with wiring channel 57.

Installation and Usage of the Unit

Some applications of the unit 10 embodied in this invention are illustrated by FIGS. 1 and 3. Banks 56 of the units 10 may be installed on top of the railroad ties 70 between the rails 71 and 72 of a railroad track. The banks 56 may be arranged with the wiring channels 57 and 61 parallel to the rails 71 and 72 with the units 10 themselves parallel to the ties 70, or the banks 56' may be arranged parallel to the tracks 71 and 72 and to the wiring channels 57 and 61 with secondary transverse wiring channels 73 parallel to the ties 70. A railroad hopper car 75 (see FIG. 1) may then be located over the banks 56 and/or 56' for thawing of its contents prior to emptying of the car 75. The between-track banks 56 and 56' may be augmented by additional banks 76 of radiant energy sources along the tops and banks 77 and 78 along the sides of a tunnel-like structure 80 through which the car 75 may be passed, and even banks 81 and 82 angled up across the lower corners.

Another application contemplated for this invention, disclosed in FIG. 2, is in an automotive assembly line body drying installation. Here the automobile body 84, supported on a conveyor rack 85, may be passed by the bottom upwardly radiating banks 56 and top corner, banks 86, side banks 87 and 88 and bottom corner banks 89 of infra-red radiation sources.

Thus this invention is so constructed that it readily may be used as a heat source for casting radiations in a substantially vertical direction and may be used in applications where heat sources previously existing would be rendered inefficient or completely useless by the retention of foreign matter which might fall on, in or enter the heat source.

While there is described above the principles of this invention in connection with specific apparatus, it is to be clearly understood that this description is made only by way of example and not as a limitation to the scope of this invention.

What is claimed is:

1. A radiant heating device comprising: a radiant heat source, a hollow shield adjacent said source having at least one convex face, said radiant heat source including at least one tubular infrared radiation element having its ends supported in connectors mounted in said hollow shield, wiring in said hollow shield for electrically connecting said connectors to a source of energy, a concave reflector opposed to said radiant heat source and extending to peripheral edges beyond at least a part of said shield to reflect rays from said source between said shield and said peripheral edges of said reflector, said reflector having an aperture directly opposite said heat source, and a convex reflector intermediate said aperture and said heat source to reflect the rays from said heat source directed toward said aperture to said concave reflector.

2. A device according to claim 1 wherein one convex face of said hollow shield is a reflector for directing rays from said heat source to said concave reflector.

3. A device according to claim 1 wherein said shield has at least one end extending exteriorly of said concave reflector for an electrical connection to said wiring.

4. A device according to claim 1 wherein said shield includes a layer of insulation between said wiring and said radiation element.

References Cited in the file of this patent

UNITED STATES PATENTS

| | | |
|---|---|---|
| 1,587,023 | Mottlau | June 1, 1926 |
| 1,666,831 | Pandolfo | Apr. 17, 1928 |
| 2,862,441 | Schmall | Dec. 2, 1958 |

FOREIGN PATENTS

| | | |
|---|---|---|
| 523,374 | Great Britain | July 12, 1940 |
| 751,813 | Germany | Apr. 12, 1954 |
| 794,270 | Great Britain | Apr. 30, 1958 |